3,062,821
1-(2-PHENETHYL) - 4 - LOWER-ALKYL-2-PIPERAZINONES AND PROCESS FOR THE PREPARATION THEREOF
Sydney Archer, Bethlehem, N.Y., assignor to Sterling Drug Inc., New York, N.Y., a corporation of Delaware
No Drawing. Filed Aug. 24, 1960, Ser. No. 51,517
5 Claims. (Cl. 260—268)

This invention relates to compositions of matter known in the art of chemistry as 1,4-disubstituted-2-piperazinones and to a process for making such compositions.

The invention sought to be patented, in its composition aspect, is described as residing in the concept of a composition having the molecular structure

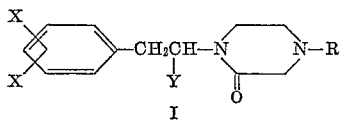

wherein R represents a lower-alkyl radical, X and X' represent a member of the group consisting of hydrogen, lower-alkoxy or hydroxy and Y represents a member of the group consisting of hydrogen and lower-alkyl.

In its process aspect, the invention sought to be patented is described as residing in the concept of reacting an N-benzyl-N-lower-alkyl-N'-[2 - (phenyl - lower - alkyl)]-ethylenediamine with a haloacetyl halide and reacting the resulting 1 - [2-(phenyl - lower - alkyl)]-4-lower-alkyl-2-piperazinone benzohalide with hydrogen in the presence of a catalyst to effect debenzylation of the quaternary ammonium salt. The reaction of the N-benzyl-N-lower-alkyl-N'-[2-(phenyl - lower - alkyl)]ethylenediamine with the haloacetyl halide is preferably carried out at a temperature in the range from about 0° C. to about 30° C. and in an organic solvent inert under the conditions of the reaction; for example, methylene dichloride, chloroform, ethylene dichloride, benzene, toluene and the like.

The catalytic debenzylation of the 1-[2-phenyl-lower-alkyl)]-4-lower-alkyl-2-piperazinone benzohalide to the 1-[2- (phenyl-lower-alkyl)]-4-lower-alkyl-2-piperazinones of formula I is carried out by reducing the former with hydrogen in the presence of a catalyst at a temperature in the range from about 20° C. to about 70° C. and under hydrogen pressures in the range from about 30 pounds p.s.i. to about 70 pounds p.s.i. The reaction is conducted in an organic solvent inert under the conditions of the reaction; for example, methanol, ethanol or 2-propanol. A preferred catalyst is palladium, for instance, on charcoal, and a preferred solvent is ethanol.

The compounds of Formula I are useful as intermediates for the preparation of compounds having the formula

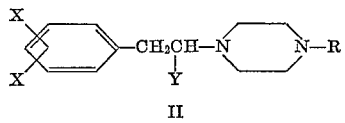

which are useful as hypotensive agents. The compounds of Formula II are prepared from the compounds of Formula I by reducing the latter by methods generally known for reduction of amides to amines; for example, by use of an alkali metal aluminum hydride, for instance, lithium aluminum hydride, in an organic solvent inert under the conditions of the reaction; for example, ethyl ether or tetrahydrofuran at a temperature in the range from about 0° C. to about 20° C.

The foregoing is a general description of the manner and process of making and using the invention so as to enable any person skilled in the art of chemistry to make and use the same.

The molecular structures of the compounds of the invention are established by their mode of synthesis and corroborated by the correspondence of calculated and found values for the elementary analysis for representative examples.

The best mode contemplated by the inventor carrying out his invention will now be set forth, as follows:

EXAMPLE 1

1-(2-Phenethyl)-4-Methyl-2-Piperazinone

[I; R is $CH_3$; X, X' and Y are H]

To a solution of 32.8 g. (0.122 mole) of N-benzyl-N-methyl-N'-(2-phenethyl)ethylenediamine (B.P. 144–148° C./0.06 mm.; M.P. dihydrochloride, 230–233° C., prepared from N-benzyl-N-methyl-N-(β-chloroethyl)amine and β-phenethylamine) in 125 ml. of methylene dichloride was added dropwise over a period of forty minutes 30 g. (0.268 mole) of chloroacetyl chloride while maintaining the temperature at 10 to 15° C. The reaction mixture was then cooled, treated with water, extracted with ether and the aqueous layer then basified with sodium hydroxide and extracted with chloroform. The chloroform extracts, on drying over anhydrous magnesium sulfate and evaporation to dryness, afforded 35 g. of a gum which, on warming on a steam bath, completely solidified.

This product, 1-(2-phenethyl)-4-methyl-2-piperazinone benzochloride, was dissolved in 225 ml. of ethanol and reduced with hydrogen over 1 g. of 10% palladium-on-charcoal catalyst under a hydrogen pressure of about 50 pounds p.s.i. When reduction was complete, the catalyst was removed by filtration, the filtrate acidified with ethanolic hydrochloric acid and then taken to dryness leaving a tan solid which was recrystallized twice from ethanol giving 1-(2-phenethyl)-4-methyl-2-piperazinone in the form of the hydrochloride, M.P. 148.2–150.8° C. (corr.).

Analysis.—Calcd. for $C_{13}H_{18}N_2O \cdot HCl$: Cl, 13.92; N, 11.00. Found: Cl, 13.74; N, 10.73.

EXAMPLE 2

1-[2-(3,4-Dimethoxyphenyl)Ethyl]-4-Methyl-2-Piperazinone

[I; R is $CH_3$; X and X' are $CH_3O$; Y is H]

A solution of 18.4 g. (0.1 mole) of N-benzyl-N-methyl-N-β-chloroethylamine and 36.2 g. (0.2 mole) of 2-(3,4-dimethoxyphenyl)ethylamine in 100 ml. of acetonitrile was stirred and refluxed for six hours. The reaction mixture was then diluted with water, basified with aqueous sodium hydroxide and extracted with ether. The ether extracts, on drying over anhydrous magnesium sulfate and evaporation to dryness, yielded a red liquid. The latter was distilled in vacuo, and the fraction boiling at 180–200° C./0.06 mm. was collected to give 15.8 g. of N - benzyl-N-methyl-N'-[2-(3,4-dimethoxyphenyl)ethyl]ethylenediamine. A small amount of the latter was converted to the hydrochloride salt which was recrystallized from ethanol giving N-benzyl-N-methyl-N'-[2-(3,4-dimethoxyphenyl)ethyl]ethylenediamine in the form of the dihydrochloride, M.P. 215.8–218.0° C. (corr.).

Analysis.—Calcd. for $C_{20}H_{28}N_2O_2 \cdot 2HCl$: C, 59.84; H, 7.53; N, 6.98. Found: C, 60.11; H, 7.80; N, 7.05.

N - benzyl - N - methyl-N'-[2-(3,4-dimethoxyphenyl)-ethyl]ethylenediamine (13.1 g., 0.04 mole) was reacted with 7 ml. of chloroacetyl chloride in 40 ml. of methylene dichloride and the resulting 1-[2-(3,4-dimethoxyphenyl)-ethyl]-4-methyl-2-piperazinone benzochloride in ethanol was reduced with hydrogen over a palladium-on-charcoal catalyst following the manipulative procedure described above in Example 1. The product, 1-[2-(3,4-dimethoxyphenyl)ethyl]-4-methyl-2-piperazinone, was converted to the p-toluenesulfonate salt and recrystallized from acetone giving 5.7 g. of 1-[2-(3,4-dimethoxyphenyl)ethyl]-4-methyl-2-piperazinone as the p-toluenesulfonate, M.P. 135.8–137.6° C. (corr.).

*Analysis.*—Calcd. for $C_{15}H_{22}N_2O_3 \cdot C_7H_8O_3S$: C, 58.65; H, 6.71; N, 6.21. Found: C, 58.35; H, 6.52; N, 6.16

I claim:

1. 1-(2-phenethyl)-4-methyl-2-piperazinone.
2. 1-[2-(3,4-dimethoxyphenyl)ethyl]-4-methyl-2-piperazinone.
3. N-benzyl-N-methyl-N'-[2-(3,4-dimethoxyphenyl)-ethyl]ethylenediamine.
4. The process for preparing 1-(2-phenethyl)-4-methyl-2-piperazinone which comprises reacting N-benzyl-N-methyl-N'-(2-phenethyl)ethylenediamine with chloroacetyl chloride and reducing the resulting 1-(2-phenethyl)-4-methyl-2-piperazinone benzochloride with hydrogen in the presence of a palladium catalyst.
5. The process for preparing 1-[2-(3,4-dimethoxyphenyl)ethyl]-4-methyl-2-piperazinone which comprises reacting N-benzyl-N-methyl-N'-[2-(3,4-dimethoxyphenyl)ethyl]ethylenediamine with chloroacetyl chloride and reducing the resulting 1-[2-(3,4-dimethoxyphenyl)ethyl]-4-methyl-2-piperazinone benzochloride with hydrogen in the presence of a palladium catalyst.

References Cited in the file of this patent

UNITED STATES PATENTS

| | | |
|---|---|---|
| 2,627,491 | Szabo et al. | Feb. 3, 1953 |
| 2,653,153 | Benneville | Sept. 22, 1953 |
| 2,876,236 | Szabo et al. | Mar. 3, 1959 |
| 2,927,924 | Mills | Mar. 8, 1960 |

UNITED STATES PATENT OFFICE
CERTIFICATE OF CORRECTION

Patent No. 3,062,821           November 6, 1962

Sydney Archer

It is hereby certified that error appears in the above numbered patent requiring correction and that the said Letters Patent should read as corrected below.

Column 1, lines 17 to 21, the structural formula should appear as shown below instead of as in the patent:

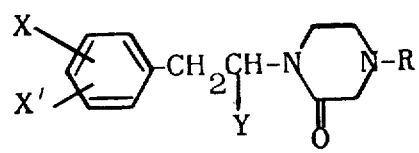

column 1, line 41, for "1-[2-phenyl-" read -- 1-[2-(phenyl- --; same column, lines 56 to 61, the structural formula should appear as shown below instead of as in the patent:

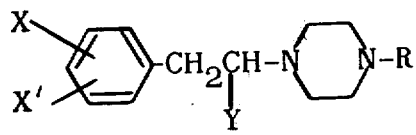

column 2, line 8, for "inventor carrying" read -- inventor of carrying --.

Signed and sealed this 22nd day of October 1963.

(SEAL)
Attest:

ERNEST W. SWIDER
Attesting Officer

EDWIN L. REYNOLDS
Acting Commissioner of Patents